(12) United States Patent
Emek et al.

(10) Patent No.: US 11,593,792 B1
(45) Date of Patent: Feb. 28, 2023

(54) DISTRIBUTED DATABASE METHODS AND SYSTEMS

(71) Applicant: CITIBANK, N.A., New York, NY (US)

(72) Inventors: Roy Emek, Tel Aviv (IL); Oren Glickman, Tsofit (IL)

(73) Assignee: CITIBANK, N.A., New York, NY (US)

( * ) Notice: Subject to any disclaimer, the term of this patent is extended or adjusted under 35 U.S.C. 154(b) by 1442 days.

(21) Appl. No.: 15/145,422

(22) Filed: May 3, 2016

(51) Int. Cl.
*G06Q 20/36* (2012.01)
*G06Q 20/10* (2012.01)
*G06Q 20/38* (2012.01)

(52) U.S. Cl.
CPC ....... *G06Q 20/3672* (2013.01); *G06Q 20/105* (2013.01); *G06Q 20/3829* (2013.01); *G06Q 20/38215* (2013.01)

(58) Field of Classification Search
None
See application file for complete search history.

(56) References Cited

U.S. PATENT DOCUMENTS

2015/0287026 A1* 10/2015 Yang ................... G06Q 20/3678 705/69
2016/0283939 A1* 9/2016 Finlow-Bates ...... G06Q 20/065
2017/0295023 A1* 10/2017 Madhavan ............ H04L 9/3247

OTHER PUBLICATIONS

Forte et al., "Beyond Bitcoin—Part I: A critical look at blockchain-based systems," Dec. 1, 2015, all pages. (Year: 2015).*
Triantafyllidis, "Developing an Ethereum Blockchain Application," Feb. 19, 2016, all pages. (Year: 2016).*
Antonopoulos, "Mastering Bitcoin," O'Reilly, all pages. (Year: 2014).*
Bonneau et al., "SoK: Research Perspectives and Challenges for Bitcoin and Cryptocurrencies," 2015 IEEE Symposium on Security and Privacy, all pages. (Year: 2015).*
Andrychowicz et al., "Modeling Bitcoin Contracts by Timed Automata," Cryptology and Data Security Group, University of Warsaw, arXiv:1405.1861v2, all pages. (Year: 2014).*

* cited by examiner

*Primary Examiner* — Jacob C. Coppola
(74) *Attorney, Agent, or Firm* — Johnson, Marcou, Isaacs & Nix, LLC; George Marcou; Scott A. Hendrix (57) ABSTRACT

Data representing ownership of a traditional asset of a first party having a predefined monetary value stored at a first party network node is replicated to a plurality of other party network nodes, including a second party network node, communicably coupled to the first party network node and to one another. Entry of data is received at the first party network node that represents a partition by the first party of the asset of the first party on a non-value axis into at least two non-overlapping assets and a transfer of ownership of one of those two assets to the second party. The data representing the partition of the non-value axis and transfer of ownership of one of the two non-overlapping assets to the second party is replicated to the plurality of other party nodes, including the second party network node.

16 Claims, 5 Drawing Sheets

DISTRIBUTED DATABASE METHODS AND SYSTEMS

FIELD OF THE INVENTION

The present invention relates generally to distributed database technology, and more particularly to technological solutions implementing a distributed database and advancing peripheral technical fields.

BACKGROUND OF THE INVENTION

Currently, potentially problematic issues in transactions may involve, for example, credit mechanisms and legal mechanisms. Assume, for example, a sale of a product or a service in which the vendor will not receive payment immediately but will instead receive payment only after expiration of a certain period of time, such as thirty days. During that thirty-day period, the vendor is exposed to a level of risk that the purchaser will not pay at the end of the thirty-day period.

A typical mechanism for addressing such risk may be a type of interest referred to as a time price differential, by which a vendor may charge more for a product or service for which purchasers are given a period of time in which to pay to compensate for the risk of non-payment. For example, instead of the usual price of $100 for immediate payment, the vendor may charge $101 for a product or service for which purchasers are given a period of time, such as thirty days, to pay in order to compensate for potential losses with respect to such purchasers who eventually do not pay.

Another way in which such risk may currently be addressed is use of a legal mechanism, such as a contract between the vendor and the purchaser that specifies a legal remedy for the vendor if the purchaser fails to pay at the end of the agreed-upon period for payment. Thus, the vendor's legal remedy may be pursued by lawyers employed by the vendor in the event of non-payment by the purchaser. There are potentially direct and indirect costs associated with these currently employed mechanisms, sometimes referred to as friction costs that include, for example, legal fees, bank fees, opportunity costs, tax implications, as well as the time value of money associated with such transactions.

There is a present need for technological solutions that address the problems of these legacy mechanisms and enable a mechanism that reduces or eliminates the friction costs associated with these currently employed transaction mechanisms. The problem to be solved is rooted in technological limitations of the legacy approaches. Improved techniques, and in particular, improved application of technology is needed to address the problems of currently employed mechanisms. More specifically, the technologies applied in the aforementioned legacy approaches fail to achieve the sought-after capabilities of the herein-disclosed techniques for improved distributed database methods and systems.

SUMMARY OF THE INVENTION

Embodiments of the invention advance the technical fields for addressing problems associated with the above described currently employed distributed database mechanisms, as well as advancing peripheral technical fields. Such embodiments are directed to technological solutions that may involve, for example, replicating, by one or more processors of a first party client device, cryptographically signed data representing ownership of at least one asset of the first party having a predefined value stored on a first party digital wallet associated with a first party network node to a plurality of other party digital wallets on other party client devices, including at least one second party digital wallet on a second party client device, associated with a plurality of other party network nodes communicably coupled to the first party network node and to one another; receiving, by the one or more processors of the first party client device, entry of cryptographically signed data on the first party digital wallet representing a partition by the first party of the at least one asset of the first party on a non-value axis into at least two non-overlapping assets of the first party and a transfer of ownership of one of the at least two non-overlapping assets of the first party to said second party; and replicating, by the one or more processors of the first party client device, the cryptographically signed data representing said partition and transfer of ownership of one of the at least two non-overlapping assets of the first party to said second party to the plurality of other party digital wallets on the other party client devices, including the at least one second party digital wallet on the second party client device, associated with the plurality of other party network nodes. It is to be understood that use of the word "coupled" herein means that the elements described as coupled may be directly connected together or may be coupled through one or more intervening elements.

In an aspect of embodiments of the invention, replicating the cryptographically signed data representing ownership of the at least one asset of the first party having the predefined value may involve, for example, replicating the cryptographically signed data representing ownership of at least one asset of a first party having a predefined monetary value stored on the first party digital wallet associated with the first party network node to the plurality of other party digital wallets on other party client devices, including the at least one second party digital wallet on the second party client device, associated with the plurality of other party network nodes.

In another aspect of embodiments of the invention, receiving entry of the cryptographically signed data representing the partition of the at least one asset of the first party on the non-value axis into at least two non-overlapping assets and the transfer of ownership of one of the at least two non-overlapping assets of the first party to the second party may involve, for example, receiving entry of the cryptographically signed data on the first party digital wallet representing the partition by the first party of the at least one asset on a non-value temporal axis into at least two non-overlapping complementary assets of the first party and the transfer of ownership of one of the at least two non-overlapping complementary assets to the second party.

In a further aspect of embodiments of the invention, receiving entry of the cryptographically signed data representing the partition of the at least one asset of the first party on the non-value temporal axis into the at least two non-overlapping complementary assets and the transfer of ownership of one of the at least two non-overlapping complementary assets of the first party to the second party may involve, for example, receiving entry of the cryptographically signed data on the first party digital wallet representing the partition by the first party of the at least one asset of the first party on the non-value temporal axis into at least two non-overlapping complementary timed assets of the first party and the transfer of ownership of one of the at least two non-overlapping complementary timed assets of the first party to the second party.

In an additional aspect of embodiments of the invention, receiving entry of cryptographically signed data representing the partition of the at least one asset of the first party on the non-value temporal axis into at least two non-overlapping complementary timed assets of the first party and the transfer of ownership of one of the at least two non-overlapping complementary timed assets of the first party to the second party may involve, for example, receiving entry of the cryptographically signed data on the first party digital wallet representing the partition by the first party of the at least one asset of the first party on the non-value temporal axis into a first complementary timed asset of the first party valid for a first predetermined period of time and a second complementary timed asset of the first party valid for a second non-overlapping predetermined period of time and the transfer of ownership of one of the at least two non-overlapping complementary timed assets of the first party to the second party.

In still another aspect of embodiments of the invention, receiving entry of the cryptographically signed data on the first party digital wallet representing the partition by the first party of the at least one asset of the first party on the non-value temporal axis into the first complementary timed asset of the first party valid for the first predetermined period of time and the second complementary timed asset of the first party valid for the second non-overlapping predetermined period of time and the transfer of ownership of one of the at least two non-overlapping complementary timed assets of the first party to the second party may involve, for example, receiving entry of the cryptographically signed data on the first party digital wallet representing the partition by the first party of the at least one asset of the first party on the non-value temporal axis into the first complementary timed asset of the first party valid for a first predetermined period of time and the second complementary timed asset of the first party valid for the second non-overlapping predetermined period of time commencing at an expiration of the first predetermined period of time and the transfer of ownership of one of the at least two non-overlapping complementary timed assets of the first party to the second party.

A still further aspect of embodiments of the invention may involve, for example, receiving entry of cryptographically signed data on one of the first party digital wallet and the at least one second party digital wallet representing a merging of a first one of said at least two non-overlapping assets with a second one of said at least two non-overlapping assets into an equivalent of said at least one asset. In another aspect, receiving entry of the cryptographically signed data representing the partition of the at least one asset of the first party on the non-value axis into at least two non-overlapping assets of the first party and the transfer of ownership of one of the at least two non-overlapping assets of the first party to the second party may involve, for example, receiving entry of the cryptographically signed data on the first party digital wallet representing the partition by the first party of the at least one asset of the first party on a non-value conditional axis into at least two non-overlapping conditional assets of the first party and the transfer of ownership of one of the at least two non-overlapping conditional assets of the first party to the second party.

In other aspects of embodiments of the invention, receiving entry of the cryptographically signed data representing the partition by the first party of the at least one asset of the first party on the non-value conditional axis into at least two non-overlapping conditional assets of the first party and the transfer of ownership of one of the at least two non-overlapping conditional assets of the first party to the second party may involve, for example, receiving entry of the cryptographically signed data on the first party digital wallet representing the partition by the first party of the at least one asset of the first party on the non-value conditional axis into the first non-overlapping conditional asset valid only for a first entity-owner of the first non-overlapping conditional asset, a second non-overlapping conditional asset valid only for a second entity-owner of the second non-overlapping conditional asset, and a switch or fuse with predetermined parameters validating ownership of one of said first and second non-overlapping conditional assets and nullifying ownership of the other of said first and second conditional assets, and the transfer of ownership of one of the at least two non-overlapping conditional assets of the first party to the second party.

In further aspects of embodiments of the invention, receiving entry of cryptographically signed data on the first party digital wallet representing a partition of the at least one asset of the first party on a non-value axis into at least two non-overlapping assets and the transfer of ownership of one of the at least two non-overlapping assets of the first party to the second party may involve, for example, receiving entry of cryptographically signed data on the first party digital wallet representing a partition by the first party of the at least one asset on both a non-value temporal axis and a non-value conditional axis into at least two non-overlapping complementary conditional timed assets of the first party and a transfer of ownership of one of the at least two non-overlapping complementary conditional timed assets of the first party to the second party.

In a still further aspect of embodiments of the invention, replicating the cryptographically signed data representing said partition and transfer of one of the at least two non-overlapping assets of the first party to said second party to the plurality of other party digital wallets on the other party client devices associated with the plurality of other party network nodes may involve, for example, replicating cryptographically signed data representing the partition and transfer of ownership of a first one of at least two non-overlapping complementary assets of the first party to the second party to the plurality of other party digital wallets on the other party client devices, including the at least one second party digital wallet on the second party client device, associated with the plurality of other party network nodes.

In still another aspect of the invention, replicating cryptographically signed data representing the partition and transfer of ownership of a first one of at least two non-overlapping complementary assets of the first party to the second party to the plurality of other party digital wallets on the other party client devices associated with the plurality of other party network nodes may involve, for example, replicating cryptographically signed data representing the partition and transfer of ownership of a first one of at least two non-overlapping complementary timed assets of the first party to the second party to the plurality of other party digital wallets on the other party client devices, including the at least one second party digital wallet on the second party client device, associated with the plurality of other party network nodes.

In a additional aspects of embodiments of the invention, replicating cryptographically signed data representing the partition and transfer of ownership of the first one of the at least two non-overlapping complementary timed assets of the first party to the second party to the plurality of other party digital wallets on the other party client devices associated with the plurality of other party network nodes may involve, for example, replicating cryptographically signed data representing the partition and transfer of ownership of the first one of the at least two non-overlapping complementary timed assets of the first party valid for a first predetermined period of time to the second party to the plurality of other party digital wallets on the other party client devices, including the at least one second party digital wallet on the second party client device, associated with the plurality of other party network nodes.

In another aspect of embodiments of the invention, replicating the cryptographically signed data representing said partition and transfer of ownership of one of the at least two non-overlapping assets of the first party to the second party to the plurality of other party digital wallets on the other party client devices associated with the plurality of other party network nodes may involve, for example, replicating cryptographically signed data representing the partition and transfer of ownership of the first one of at least two non-overlapping conditional assets of the first party to the second party to the plurality of other party digital wallets on the other party client devices, including the at least one second party digital wallet on the second party client device, associated with the plurality of other party network nodes.

In other aspects of embodiments of the invention, replicating cryptographically signed data representing the partition and transfer of ownership of a first one of at least two non-overlapping conditional assets to the second party to the plurality of other party digital wallets on the other party client devices associated with the plurality of other party network nodes may involve, for example, replicating cryptographically signed data representing the partition and transfer of ownership of a first one of the at least two non-overlapping conditional assets valid only for a first entity-owner of the first conditional asset to the second party to the plurality of other party digital wallets on the other party client devices, including the at least one second party digital wallet on the second party client device, associated with the plurality of other party network nodes.

Another aspect of embodiments of the invention may involve, for example, replicating cryptographically signed data representing transfer of ownership of a switch or fuse of the first party to a third party digital wallet to the plurality of other party digital wallets on the other party client devices validating ownership of one of said first and second non-overlapping conditional assets and nullifying the other of said first and second non-overlapping conditional assets. In an additional aspect, the cryptographically signed data may be signed, for example, with a private key of a private-public key pair Embodiments of the invention employ computer hardware and software, including, without limitation, one or more processors coupled to memory and non-transitory computer-readable storage media with one or more executable programs stored thereon which instruct the processors to perform the methods and systems described herein.

These and other aspects of the invention will be set forth in part in the description which follows and in part will become more apparent to those skilled in the art upon examination of the following or may be learned from practice of the invention. It is intended that all such aspects are to be included within this description, are to be within the scope of the present invention, and are to be protected by the accompanying claims.

DETAILED DESCRIPTION

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used in another embodiment to yield a still further embodiment. Thus, it is intended that the present invention cover such modifications and variations that come within the scope of the invention.

Embodiments of the invention propose systems and methods that enable a mechanism that reduces, and in some cases may eliminate, the friction costs of currently employed mechanisms. For example, embodiments of the invention may provide a way to guarantee that a vendor will receive funds for a payment at the end of a period, such as thirty days, and at the same time assure that a purchaser is able to retain the use of those funds during that period, while also reducing, if not eliminating, associated friction costs.

The traditional definition of ownership is a relationship between the owner and the asset. Thus, while an owner may transfer an asset, in whole or in parts, to one or more other entities, once ownership of the asset is passed to the other entity or entities, ownership of that asset can taken from such other entity or entities only through legal means. For example, currently an owner who has $100 may split that asset into two parts, such as $50 that may be given to another entity and $50 that the owner may retain, which may be characterized as a split of that asset on a value axis by the owner.

Timed Assets

While the owner can split such an asset of a monetary value, such as $100, on a value axis, the owner cannot currently split that asset on a time axis and say to the other entity, for example, "This $100 is mine now, but will be yours in thirty days." Technological systems and methods for embodiments of the invention may enable the creation of a new type of asset, in which an asset of a value, such as $100, may be split on a temporal or time axis into two or more complementary assets, referred to herein as a timed asset.

One of those timed assets for embodiments of the invention may comprise, for example, $100 which is valid only from a current point in time until the lapse of a predefined period of time, such as thirty days, from the current point in time, after which that timed asset disappears. The other of those timed assets, for example, may come into existence only after the lapse of those thirty days. It is to be understood that such predefined period of time may be any number of minutes, days, weeks, months, years, or any other suitable period of time.

Continuing with the same example, in embodiments of the invention, the owner of an asset, such as $100, who wishes to purchase $100 worth of products or services and pay for the purchase in thirty days may split that $100 on a time axis into two timed assets. One of those two timed assets may comprise, for example, $100 which is valid for only thirty days from the present time, and the other of which may be $100 that is valid only after thirty days from the present time. Thus, the owner of those timed assets may, for example, use the timed asset that becomes valid only after thirty days from the present time as current payment for the purchase, in which case there is zero risk of default, and may use the timed asset that is valid only for thirty days from the present time, for example, to continue to trade with or pay to other vendors.

It is to be understood that such uses by an owner of timed assets for embodiments of the invention differs greatly, for example, from an owner merely selling a receivable or using a receivable as payment. For example, a receivable that an owner sells or uses as payment still carries an inherent credit risk that the party who owes the receivable amount will default when payment is due on the receivable.

Even if payment of the receivable is guaranteed by the owner who sells or uses it as payment or by some third party, the inherent risk is still present that either or both the party who owes the receivable amount and the third party who guarantees payment will default. However, the timed asset that becomes valid only after a predetermined period of time enabled by the technological systems and methods for embodiments of the invention eliminates that risk of default and assures that a vendor who receives the timed asset as current payment has good funds at the end of such period.

Embodiments of the invention may employ, for example, a type of distributed transaction database or ledger, such as a blockchain, that enables creation of timed assets, as well as the creation of other types of complementary assets split on other non-value axes. Thus, embodiments of the invention provide a technological improvement in the form of a distributed database that may define ownership definitively and enable ownership to be moved automatically between entities without involving legal claims by one entity against another.

Figure 1:
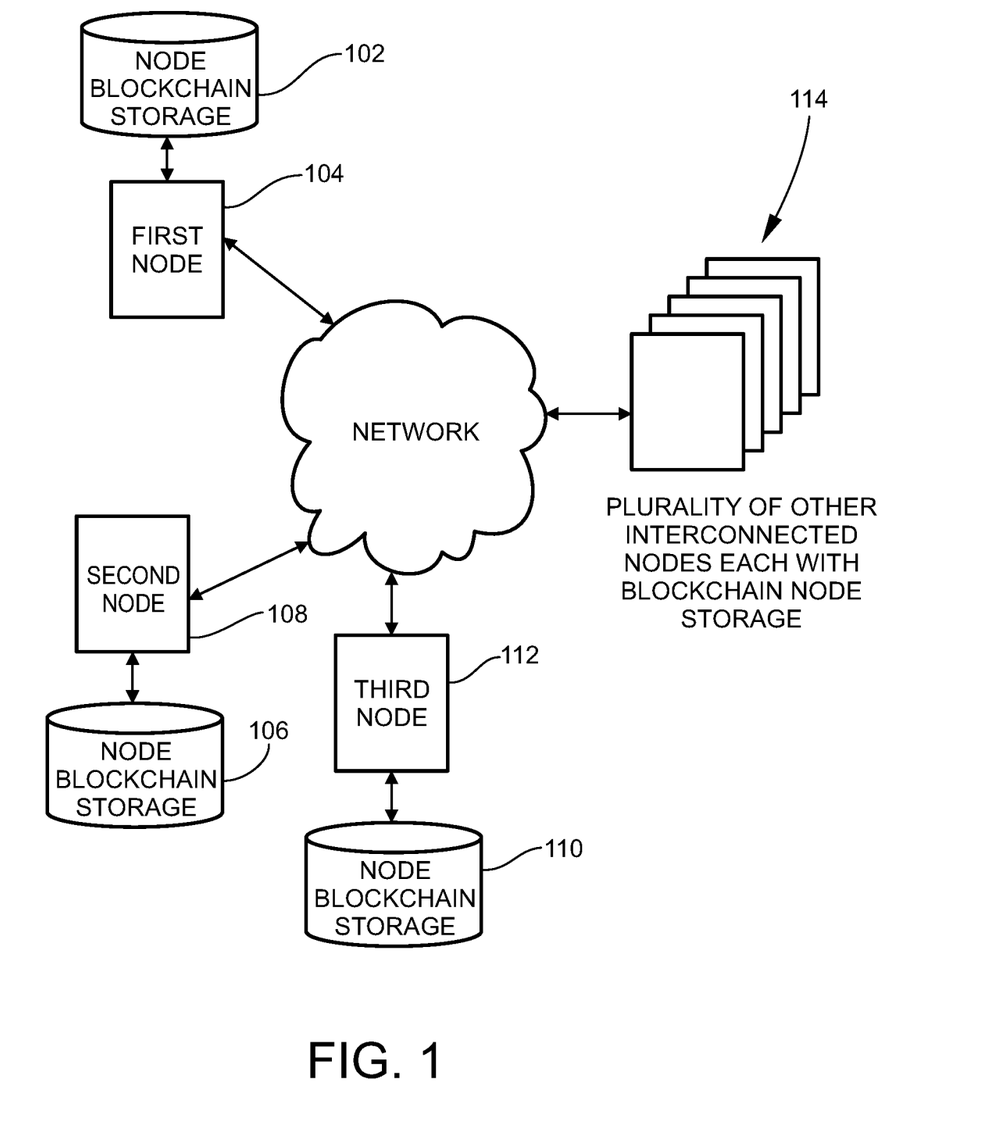
FIG. 1 is a schematic diagram that illustrates an example of a network of interconnected nodes for implementation of a distributed ledger over a blockchain for embodiments of the invention.

FIG. 1 is a schematic diagram that illustrates an example of a network of interconnected nodes for implementation of a distributed ledger over a blockchain for embodiments of the invention. Referring to FIG. 1, each network node has associated node blockchain storage, such as node blockchain storage 102 associated with first network node 104, node blockchain storage 106 associated with second network node 108, and node blockchain storage 110 associated with third network node 112. Referring further to FIG. 1, transactions may be created by any of the 4 nodes in the network, and then communicated to the other nodes.

Figure 2:
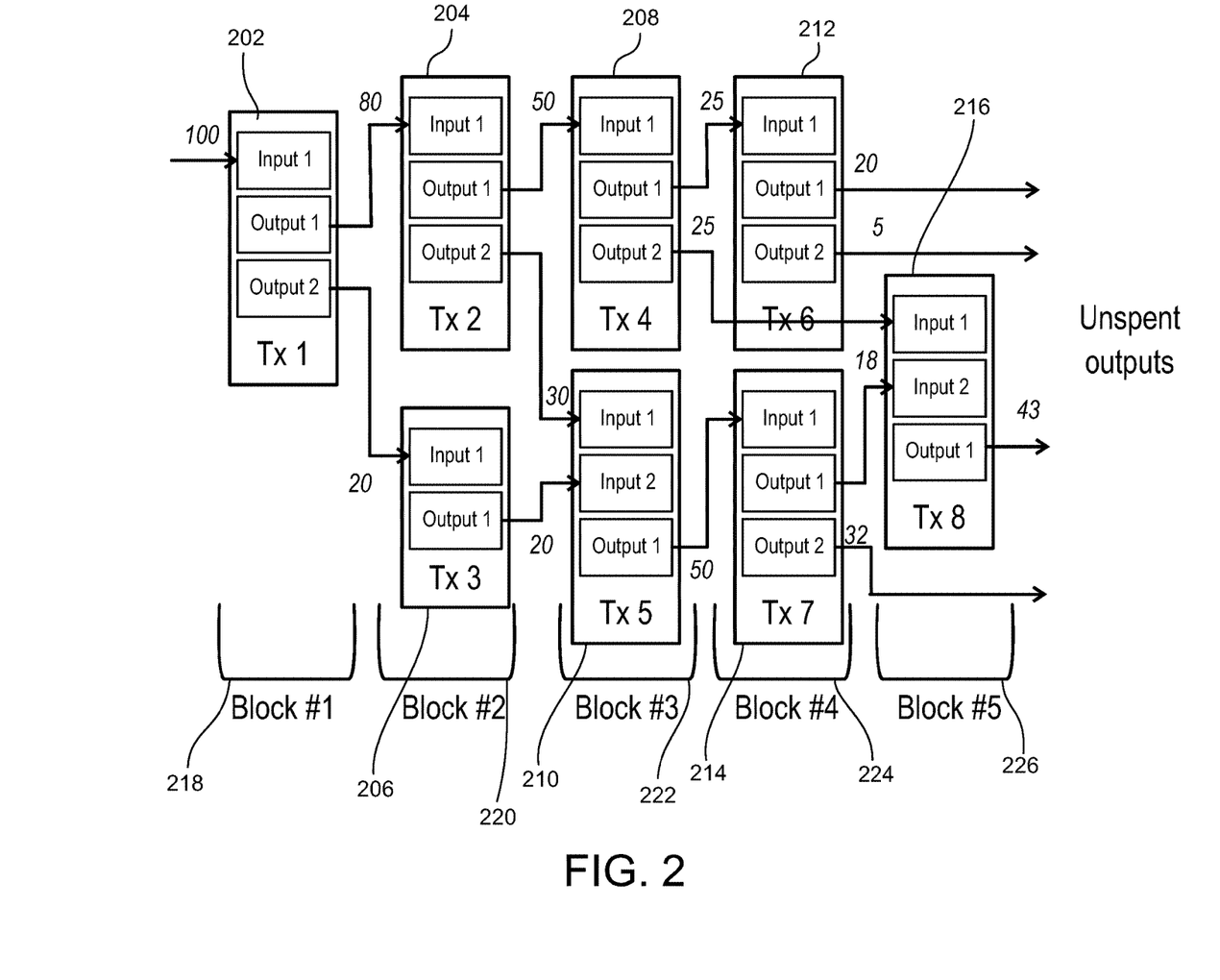
FIG. 2 is a schematic diagram that illustrates an example of a set of transactions in a distributed ledger in which transactions between network nodes may be grouped into a block, and a sequence of blocks forms the blockchain.

FIG. 2 is a schematic diagram that illustrates an example of a set of transactions in a distributed ledger in which transactions between network nodes may be grouped into a sequence of blocks in a blockchain. Referring to FIG. 2, each transaction may be represented, for example, by a transaction number, such as transactions Tx 1 202, Tx 2 204, Tx 3 206, Tx 4 208, Tx 5 210, Tx 6 212, Tx 7 214, or Tx 8 216. Referring further to FIG. 2, in embodiments of the invention, such transactions may be bundled into blocks, represented by block numbers, such as Block #1 218, Block #2 220, Block #3 222, Block #4 224, or Block #5 226.

Referring to FIGS. 1 and 2, each block in the blockchain may represent one or more transactions involving one or more inputs and outputs, and information regarding each transaction may be replicated to all of the interconnected network nodes.

Currently, a sale by an entity of a receivable, such as a receivable that is due in thirty days, is simply a sale of a legal claim against another entity that owes the amount of the receivable that it payable in thirty days. During the thirty-day period before payment is due, the purchasing entity has nothing but a legal claim against the entity that owes the amount of the receivable, and there is no certainty that the entity owing the amount of the receivable will not default at the end of the thirty-day period.

Thus, the purchasing entity is burdened not only by the friction cost associated with the risk of default, such as a discounted value of the receivables and potential collection fees, but also the time value of money associated with the receivables. That is true even if the purchasing entity receives a guarantee of such receivables from the selling entity or a third party, since there is likewise a risk of default by the guarantor.

As noted, the technological improvement provided by embodiments of the invention in the form of the distributed database eliminates legal claims by one entity against another and enables splitting of an asset, for example, on the temporal axis, which removes all risk of default. Instead of a legal claim that matures after a predetermined period of time, such as a receivable that is payable in thirty days, the distributed database for embodiments of the invention enables the owner of such as asset to partition or split that asset on the time axis.

For example, given an asset A, the owner of the asset may partition that asset into two or more timed assets (TA) for embodiments of the invention, each of which timed assets has a start-time and an expiration time. One of such timed assets may exist, for example, from now to an expiration time T, [now, T), and another of such timed assets may exist from time T onward, [T, ∞), as represented by the function A→TA [now, T), TA [T, ∞).

Together, the time partitions or slices of the timed assets (TAs) for embodiments of the invention may involve a partition of the time from now to eternity, and specifically, no two time slices may overlap. Further, the technological improvement provided by embodiments of the invention in the form of the distributed database enables ownership of such timed assets to be transferred and exchanged as any other regular assets. For example, Adam at first network node 104 may transfer ownership of a timed asset TA [T, ∞), such as $100 [Mar. 1, 2016, ∞), to Bob at second network node 108 in exchange for some service or product.

Moreover, given two or more timed assets or TAs with adjacent times, such as a start-time from now to time T, [now, T), and a potential expiration time from time T onward, [T, ∞), the owner of these assets may merge the timed assets into a single timed asset TA, [now, ∞), whose time slice is the union of the two original time slices or TA[now, T), TA[T, ∞)→TA[now, ∞). It should be noted that the result of such merger, TA(now, ∞), may be equivalent to a traditional asset, A, which is not a timed asset. Thus, the partition or split and merge operators described above maintain an "asset conservation law", in which assets cannot be created or destroyed.

Referring again to the function, A→TA[now, T), TA[T, ∞), as noted, an asset may be indicated by A, a timed asset may be designated by TA, and the terms TA[now, T) and TA[T, ∞) may indicate the time periods for which the time asset TA is valid. The notation [now, T) may be indicative, for example, of an interval of time from now to time T that is inclusive of now but exclusive of time T, and the notation [T, ∞) may be indicative of an interval from time T to infinity or forever after.

Referring to FIG. 1, assume, for example, that a purchaser with address ABC associated with a first network node 104 partitions an asset, such as $100, into a first timed asset that is $100 (valid now to 30 days from now) and a second timed asset that is $100 (valid 30 days from now and thereafter) and transfers ownership of the second timed asset to a seller with address DEF connected to second network node 108 to pay the seller, while retaining the first timed asset at address ABC. Assume further that the purchaser already owns, or shortly thereafter receives at the first network node 104 in another transaction, a third timed asset that is $100 (valid 30 days from now and thereafter), similar to the second timed asset previously paid to the seller at the second network node 108. The purchaser at the first network node 104 may now merge the retained first timed asset that is $100 (valid now to 30 days from now) with the third timed asset that is $100 (valid 30 days from now and thereafter) that was already owned or thereafter received at the first network node 104, resulting in a regular or traditional asset of $100 that is no longer partitioned or split.

As noted, the technological improvement provided by embodiments of the invention in the form of the distributed ledger enables creation of digital currency in the form of timed assets from a traditional asset. As also noted, a first one of such timed assets may be created immediately and expire after a predetermined period of time, a complementary second one of such timed assets may be born after expiration of the predetermined period and never expire, and the first and second timed assets may be merged into a traditional asset that is born immediately and never expires.

Conditional Assets

In addition to the timed asset aspect, the technological improvement provided by embodiments of the invention in the form of the distributed database, may also enable partition or division of a traditional asset on a further axis to create another type asset referred to herein as a conditional asset. Partition or division on such further axis may involve, for example, defining certain conditions or parameters under which an asset, such as funds, may be owned by one of a first entity-owner and a second entity-owner.

Referring, for simplicity, to a trade example, assume a sale of a $100 product by a seller to a buyer in which the seller is to ship the product to the buyer, and the buyer is to pay for the product only if and when the buyer receives the shipped product. Currently, such a transaction may involve, for example, an escrow agent to whom the buyer pays the purchase price to hold until the buyer receives the product and to release to the seller upon receipt of the product by the buyer. In such an arrangement, there is a risk, for example, of dishonesty of the escrow agent, as well as legal fees and the time value of money during a potentially protracted legal dispute over conflicting instructions to the escrow agent by the seller and buyer.

The conditional asset aspect for embodiments of the invention may involve, for example, a switch or fuse, which may be a variable that can take one of three states, such as unknown or 'Null', 'True', or 'False'. Similar to the concept of timed assets, given the switch or fuse F, the owner of a traditional asset may partition or split the traditional asset into two conditional assets that may be represented by the function, A→CA(F, True), CA (F, False), and F, where F is the fuse itself. In the conditional asset aspect, the switch or fuse may determine whether an asset is owned by a first entity-owner or a second entity-owner. For example, the first entity may own the asset when the switch or fuse is set to "True", and the second entity may own the asset when the switch or fuse is set to "False". Once the switch or fuse is set, it may not be reversed Similar to timed assets for embodiments of the invention, two conditional assets that relate to the same traditional asset and different states of the same fuse may be merged or collapsed into a single traditional asset. Further, a single fuse may also relate to a collection of assets. For example, given two traditional assets, A and B, those assets, A, B, may be split into conditional assets, A(F, True) and B(F, False), A(F, False) and B(F, True) or A, B→A(F, True)&B(F, False), A(F, False)&B(F, True).

Moreover, both fuses and conditional assets may themselves be timed assets. For example, the technological improvement provided by embodiments of the invention in the form of the distributed database, also enables a switch or fuse, F, to be split on the time axis into F[now, Mar. 1, 2016) and F[Mar. 1, 2016, ∞). Thus, the switch or fuse of the conditional asset aspect for embodiments of the invention provides a significant degree of flexibility. For a simple example of such flexibility, embodiments of the invention may be employed to replace a mechanism, such as an escrow-type mechanism. In addition, embodiments of the invention may be employed to replace more complicated mechanisms and to define assets that are considerably more sophisticated.

For example, in a traditional escrow mechanism, Adam may pay a sum, such as $100 into an escrow with a condition that the sum will be paid to Beth if an event occurs but returned to Adam if the event does not occur. The technological improvement provided by embodiments of the invention in the form of the distributed database enables splitting that asset, such as $100, into two conditional assets, one of which is $100 with the fuse set to True or that the event occurs, (CA True), and the other which is $100 with the fuse set to False that the event does not occur. (CA False).

Further, embodiments of the invention enable additional splitting, for example, of one of the conditional assets, such as the conditional asset with the fuse set to True (the event occurs or CA True), on a time axis. Assume, for example, the traditional escrow in which Adam pays the sum, such as $100, into the escrow but with a condition that the sum will be paid to Beth if the event occurs within a predetermined period of time, such as thirty days, but returned to Adam if the event does not occur within the predetermined period of time. In embodiments of the invention, the conditional asset with the fuse set to True, (CA True), may be split on a time axis into two time assets, one of which is the event occurs between now and thirty days and the other of which is the event occurs at some time after thirty days.

Implementation

As noted, the timed assets, fuses, and conditional assets for embodiments of the invention may be implemented using a distributed ledger such as a blockchain. Referring, for example, to FIG. 2, each of transactions Tx 1 202 through Tx 8 216 on a distributed ledger may have a set of inputs and a set of outputs. A transaction input is a reference to an output of a previous transaction, which may be represented as (Tx-id, Output #). In the distributed ledger for embodiments of the invention, a transaction output may be either an asset-identifier, amount, optional time range, an optional fuse identifier or simply a fuse identifier, which creates the fuse.

Figure 3:
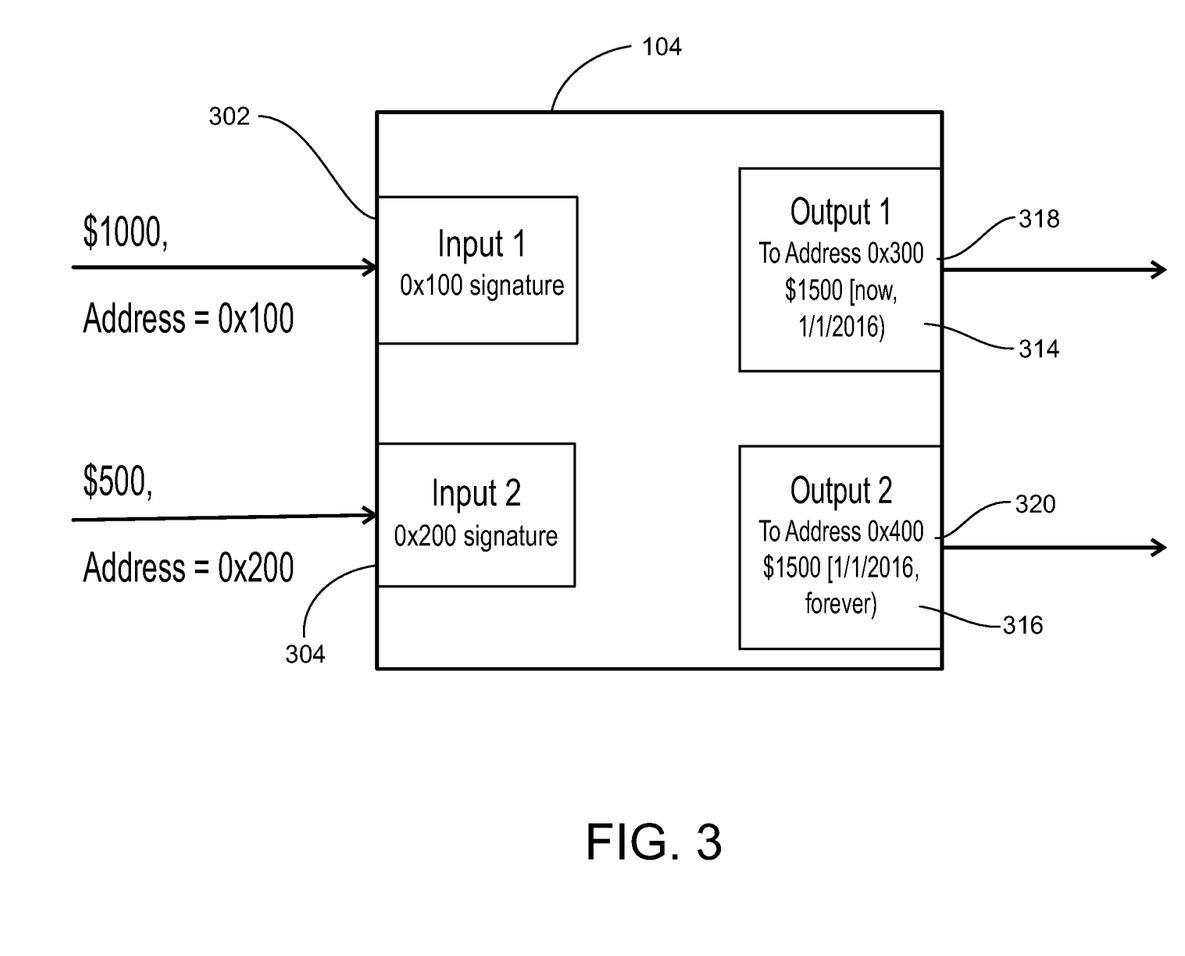
FIG. 3 is a schematic diagram that illustrates an example of a transaction that creates a timed asset for embodiments of the invention.

FIG. 3 is a schematic diagram that illustrates an example of a transaction that creates a timed asset for embodiments of the invention. Referring to FIGS. 1 and 3, inputs 1 and 2 with different addresses 302 and 304 may represent ownership by a first party of a traditional asset having a total monetary value of $1,500 stored on the first party digital wallet associated with a first party network node 104. Cryptographically signed data representing such ownership may be replicated to a plurality of other party digital wallets on other party client devices, including at least one second party digital wallet on a second party client device, associated with a plurality of other party network nodes 108, 112, and 114 communicably coupled to the first party network node 104 and to one another.

Referring further to FIGS. 1 and 3, outputs 1 and 2 with different addresses 318 and 320 may refer to receipt of entry of cryptographically signed data on the first party digital wallet associated with the first party network node 104 representing a partition by the first party of the traditional $1,500 asset of the first party on a non-value axis into two non-overlapping assets of the first party and a transfer of ownership of one of the at least two non-overlapping assets to the second party. For example, the $1500 traditional asset may be partitioned on the non-value axis into a first complementary timed asset 314 of the $1500 asset from now to a predetermined expiration date and a second complementary asset 316 of the $1500 asset from the predetermined expiration date and thereafter. Additionally, the cryptographically signed data representing the partition and transfer of ownership of one of the two non-overlapping assets 314 or 316 of the first party to the second party may be replicated to the plurality of other party digital wallets associated with the plurality of other party network nodes 108, 112, and 114.

In embodiments of the invention, transaction inputs and outputs may have an ownership indicator that may be implemented via a private-key public-key signature mechanism for a blockchain. Further, a transaction may be valid only under certain conditions. For example, a transaction may be valid if and only if all inputs are signed with the private keys of public-private key pairs of the respective owners of the outputs which they consume. An exception to this rule may be a fuse that was already set, for example, to "True" or to "False" by its owner. This type of fuse may be used by non-owner parties. In addition, a transaction may be valid if and only if for any asset A, including a timed asset or a conditional asset, that is consumed by one or more of the inputs of the transaction, the sum of inputs of asset A is equal to the sum of the outputs of asset A. Thus, an entity that inputs an asset A, such as $100, may not spend in excess of $100, but may spend up to $100 or less.

Figure 4:
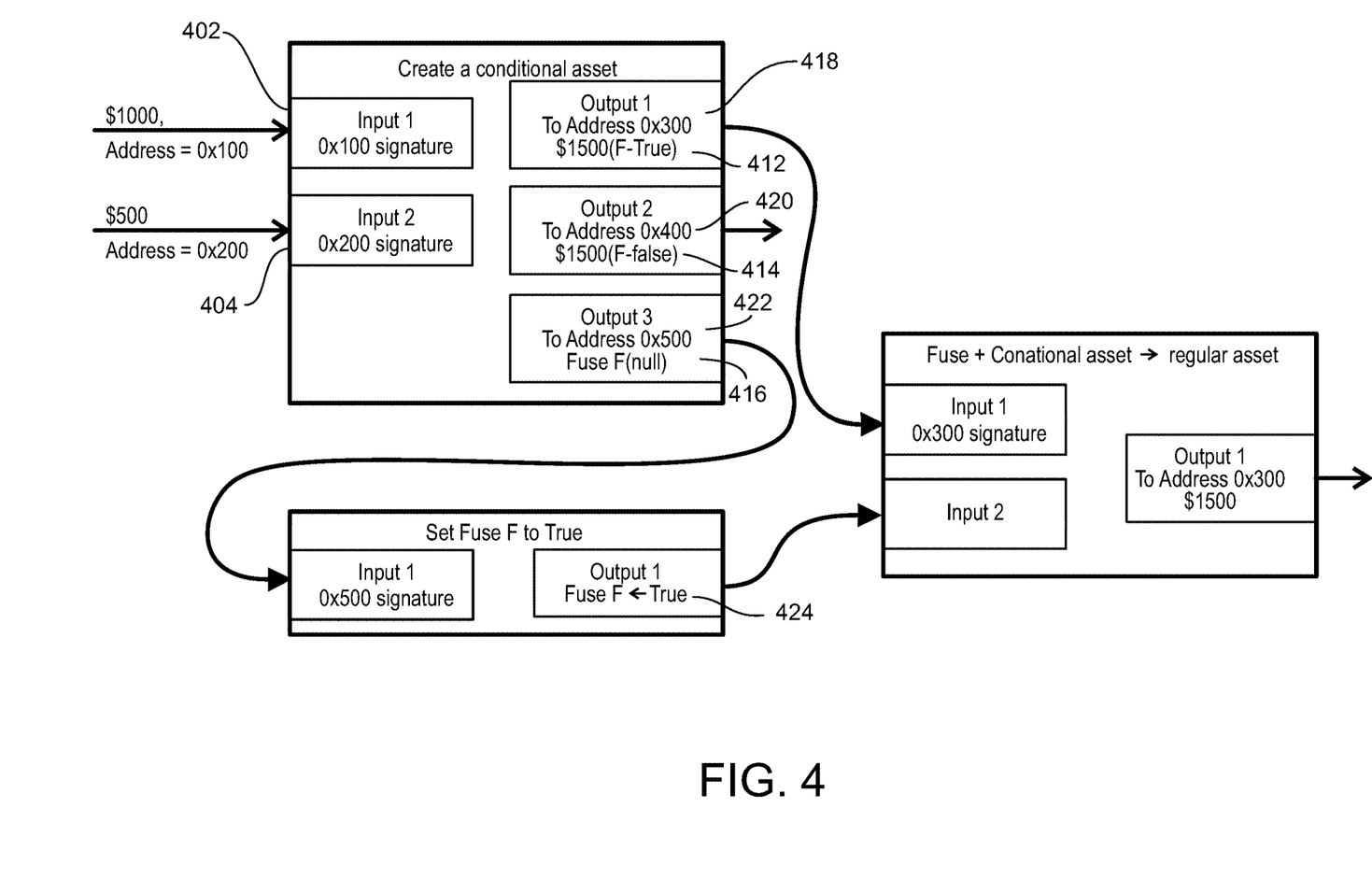
FIG. 4 is a schematic diagram that illustrates an example of a transaction that creates a conditional asset for embodiments of the invention.

FIG. 4 is a schematic diagram that illustrates an example of a transaction that creates a conditional asset for embodiments of the invention. Referring to FIGS. 1 and 3, inputs 1 and 2 with different addresses 402 and 404 may represent ownership of a traditional asset having a total monetary value of $1,500 stored on a first party digital wallet associated with a first party network node 104. Cryptographically signed data representing such ownership may be replicated to a plurality of other party digital wallets on other party client devices, including at least one second party digital wallet on a second party client device, associated with a plurality of other party network nodes 108, 112, and 114 communicably coupled to the first party network node 104 and to one another.

Referring further to FIGS. 1 and 4, outputs 1, 2, and 3 with different addresses 418, 420, and 422 may refer to receipt of entry of cryptographically signed data on the first party digital wallet associated with the first party network node 104 representing a partition by the first party of the traditional $1,500 asset of the first party on a non-value axis into two non-overlapping conditional assets of the first party, a transfer of ownership of one of the two non-overlapping conditional assets to the second party, and creation and transfer of a switch or fuse 416 to a third party at a third node 112.

For example, the $1500 traditional asset may be partitioned on the non-value axis into a first non-overlapping conditional asset 412 of the partitioned asset with a fuse "F" set to "True" and a second overlapping conditional asset 414 of partitioned asset with a fuse "F" set to "False", as well as the creation and transfer of the fuse 416, to the third party. Additionally, the cryptographically signed data representing the partition and transfer of ownership of one of the two non-overlapping assets 412 or 414 of the first party to the second party, as well as the creation and transfer of the fuse 416 to the third party, may be replicated to the plurality of other party digital wallets associated with the plurality of other party network nodes 108, 112, and 114.

Thus, one of the conditional assets 412 may be the $1,500 on condition that an event does not occur (i.e., fuse "F" set to "False") transferred by the first party to the second party, and the other conditional asset 414 may be the $1,500 on condition that the event does occur (i.e. fuse "F" set to "True") retained by the first party. In addition, the fuse "F" 416 that determines which of the two conditional assets will be valid transferred to the third party may be unset or null. For example, the switch or fuse "F" 416 may be delivered to a third party who is trusted by both the first party and the second party to determine whether or not the event occurs and to set the switch or fuse "F" 416 to "True" 424 if the event occurs or to "False" if the event does not occur.

The aforementioned calculus for embodiments of the invention applies to both timed and conditional assets. Thus, an asset A may be split into: A→TA[now, T), TA[T, ∞). Additionally, a timed asset TA[T1, T3) may be further split into: TA[T1, T3)→TA[T1, T2), TA[T2, T3) where T1<T2<T3. Further, two timed assets may be combined: TA[T1, T2), TA[T2, T3)→TA(T1, T3). Also, an asset A may be split according to a condition: A→CA(F, True), CA(F, False), F Null, where F Null is an unset fuse. In addition, two conditional assets for the same asset and the same fuse can be combined: CA(F, True), CA(F, False), F Null→CA In embodiments of the invention, the owner of an unset fuse may set it to "True" or to "False", for example, F Null→F True or F→F False. A fuse F may be set to "True" or to "False" only once, even if it was split into multiple timed segments. A set fuse may be used to turn its corresponding asset into an unconditional asset: CA(F, True), F True→A or CA(F, False), F False→A. It is to be understood that the notion of fuses and conditional assets for embodiments of the invention may be easily expanded to support, for example, a single fuse that controls multiple assets or to support fuses with non-Boolean discrete states (e.g., Red, Blue, Green, etc.).

In embodiments of the invention, a transaction is valid if an asset is split into two or more timed assets of the same or smaller value. The reverse is likewise true in embodiments of the invention that a merge of two or more timed assets that refer, for example, to the same asset value, and with adjacent times, is also valid. Further, an asset may be used to create two or more conditional assets and a fuse, and two or more conditional assets and the fuse may be merged or collapsed back to a traditional asset.

A significant aspect of the systems and methods for embodiments of the invention is assuring that there is no systemic risk, in that the total value of an asset is not changed over time if it is split or merged. That aspect may be analogized to conservation of mass, in that value cannot be generated out of something that does not exist, such that a traditional asset, such as $100, that is partitioned or split on a time axis is split in such a way that the resulting complementary assets may be merged back to that same $100 traditional asset. Thus, the total $100 asset value is stable and remains in the system regardless of being split into complementary assets and transferred.

Use Cases

For an example of a deferred-type payment use case, assume that Adam buys a product from Bob for a purchase price of $100 with payment terms of Net-30 days. Traditionally, Bob must trust that Adam would pay Bob the purchase price after 30 days. However, using timed assets enabled by the technological improvement provided by embodiments of the invention, Adam may partition or split the $100 asset that Adam has in his bank account into $100 [now, 30 days from now) and $100 [30 days from now, ∞) and deliver the $100 [30 days from now, ∞) timed asset to Bob.

For an example of an escrow-type payment use case, assume that Adam owes a sum, such as $100, to Bob only if a predefined event, such as receipt by Adam of the product in 60 days, occurs. Traditionally, Adam may pay the $100 into escrow pending occurrence of the event, in which case neither Adam nor Bob has the $100, which may be held, for example, by an escrow agent. Further, in the traditional escrow mechanism, Adam and Bob must trust that the escrow agent will either pay the $100 to Bob or return it to Adam, depending on the occurrence or non-occurrence of the event.

However, using conditional assets and the switch or fuse enabled by the technological improvement provided by embodiments of the invention, Adam may, for example, split the $100 into two conditional assets. One of the conditional assets may be $100 on the condition that the event occurs and the other conditional asset may be $100 on the condition that the event does not occur. At this point, there are three elements in existence, namely the $100 conditional asset which assumes that the event occurs (CA True) which may be delivered to Bob, the $100 conditional asset which assumes that the event does not occur (CA False) which may be retained by Adam, and the switch or fuse that determines which $100 will be valid.

Continuing with the foregoing escrow-type example for embodiments of the invention, the switch or fuse may be delivered to a third party who is trusted by both Adam and Bob, not to hold the $100, but merely to determine whether or not the event occurs. If and when the event occurs, the trusted third party may set the switch to make the $100 conditional asset held by Bob valid and to nullify the $100 conditional asset held by Adam, and if the event does not occur, the trusted third party may set the switch to make the $100 conditional asset held by Adam valid and to nullify the $100 conditional asset held by Bob.

As opposed to traditional escrows in which Adam and Bob agree to deposit the payment in an escrow with a third party to hold as escrow agent for this period of time, in embodiments of the invention, the trusted third party holds only the fuse and not the asset itself. Further, as opposed to multi-signature based escrow implementations, this implementation for embodiments of the invention allows Bob to further transfer ownership of the conditional asset, or parts of the conditional asset, for example, to Bob's suppliers.

Figure 5:
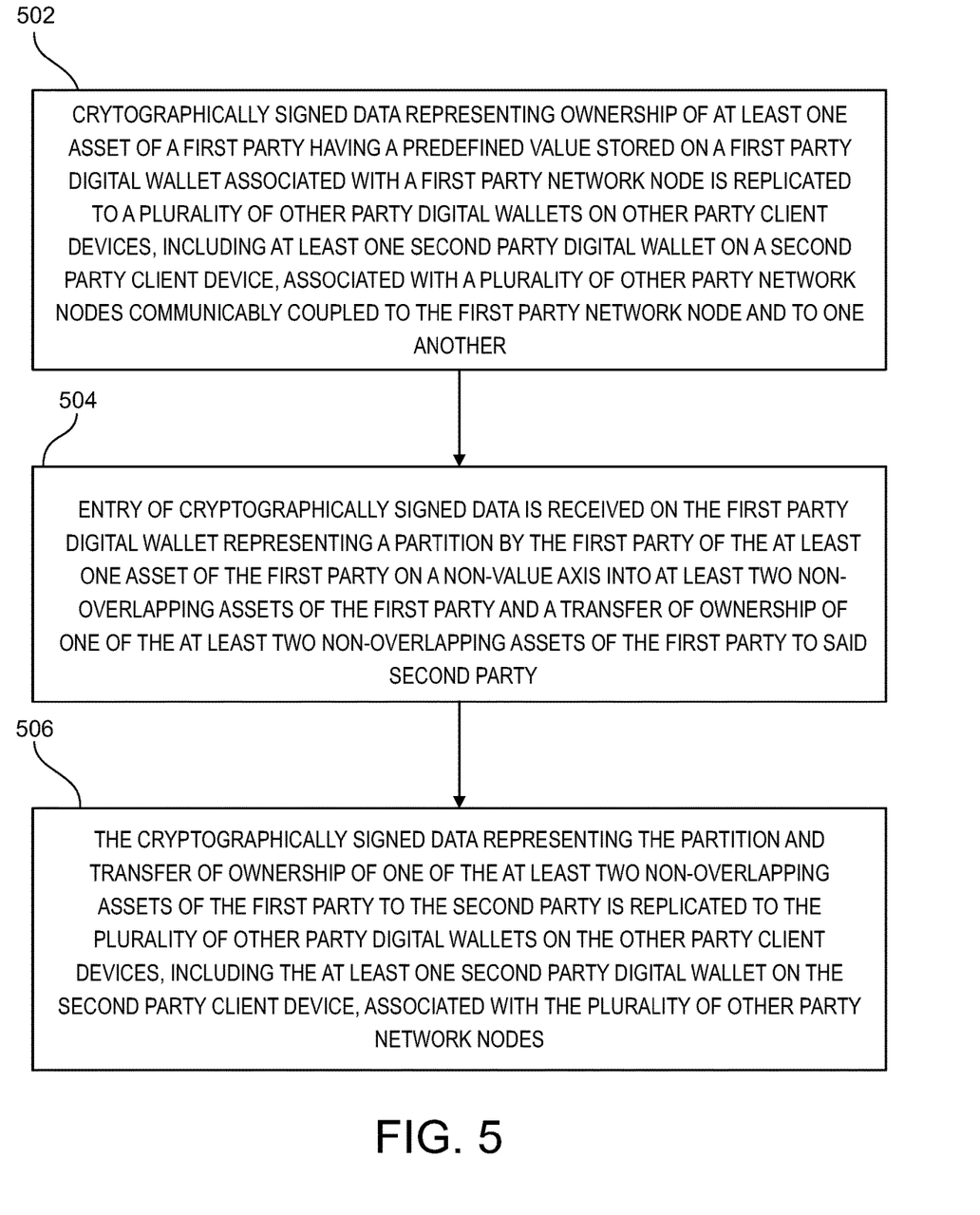
FIG. 5 is a flow chart that illustrates an example of a distributed database process for embodiments of the invention.

FIG. 5 is a flow chart that illustrates an example of a distributed database process for embodiments of the invention. Referring to FIG. 5, at 502, Cryptographically signed data representing ownership of at least one asset of a first party having a predefined value stored on a first party digital wallet associated with a first party network node is replicated to a plurality of other party digital wallets on other party client devices, including at least one second party digital wallet on a second party client device, associated with a plurality of other party network nodes communicably coupled to the first party network node and to one another.

Referring further to FIG. 5, at 504, entry of cryptographically signed data is received on the first party digital wallet representing a partition by the first party of the at least one asset of the first party on a non-value axis into at least two non-overlapping assets of the first party and a transfer of ownership of one of the at least two non-overlapping assets of the first party to said second party. Thereafter, at 506, the cryptographically signed data representing the partition and transfer of ownership of one of the at least two non-overlapping assets of the first party to the second party is replicated to the plurality of other party digital wallets on the other party client devices, including the at least one second party digital wallet on the second party client device, associated with the plurality of other party network nodes.

It is to be recognized that the technological improvement provided by embodiments of the invention, may also enable creation of timed assets for use in transactions involving, for example, securities, such as such as derivatives, with prices that are dependent upon or derived from one or more underlying assets, and with immediate settlement. In addition, embodiments of the invention may enable creation of conditional assets for use, for example, in transactions involving options.

It is to be understood that embodiments of the invention may be implemented as processes of a computer program product, each process of which is operable on one or more processors either alone on a single physical platform, such as a personal computer, or across a plurality of platforms, such as a system or network, including networks such as the Internet, an intranet, a WAN, a LAN, a cellular network, or any other suitable network. Embodiments of the invention may employ client devices that may each comprise a computer-readable medium, including but not limited to, random access memory (RAM) coupled to a processor. The processor may execute computer-executable program instructions stored in memory. Such processors may include, but are not limited to, a microprocessor, an application specific integrated circuit (ASIC), and or state machines. Such processors may comprise, or may be in communication with, media, such as computer-readable media, which stores instructions that, when executed by the processor, cause the processor to perform one or more of the steps described herein.

It is also to be understood that such computer-readable media may include, but are not limited to, electronic, optical, magnetic, RFID, or other storage or transmission device capable of providing a processor with computer-readable instructions. Other examples of suitable media include, but are not limited to, CD-ROM, DVD, magnetic disk, memory chip, ROM, RAM, ASIC, a configured processor, optical media, magnetic media, or any other suitable medium from which a computer processor can read instructions. Embodiments of the invention may employ other forms of such computer-readable media to transmit or carry instructions to a computer, including a router, private or public network, or other transmission device or channel, both wired or wireless. Such instructions may comprise code from any suitable computer programming language including, without limitation, C, C++, C#, Visual Basic, Java, Python, Perl, and JavaScript.

It is to be further understood that client devices that may be employed by embodiments of the invention may also comprise a number of external or internal devices, such as a mouse, a CD-ROM, DVD, keyboard, display, or other input or output devices. In general such client devices may be any suitable type of processor-based platform that is connected to a network and that interacts with one or more application programs and may operate on any suitable operating system. Server devices may also be coupled to the network and, similarly to client devices, such server devices may comprise a processor coupled to a computer-readable medium, such as a random access memory (RAM). Such server devices, which may be a single computer system, may also be implemented as a network of computer processors. Examples of such server devices are servers, mainframe computers, networked computers, a processor-based device, and similar types of systems and devices.

What is claimed is:

1. A method, comprising:
replicating, by one or more processors of a first party client device, cryptographically signed data representing ownership of at least one asset of the first party having a predefined value stored on a first party digital wallet associated with a first party network node to a plurality of other party digital wallets on other party client devices, including at least one second party digital wallet on a second party client device, associated with a plurality of other party network nodes communicably coupled to the first party network node and to one another;
receiving, by the one or more processors of the first party client device, entry of cryptographically signed data on the first party digital wallet representing a partitioning by the first party of the at least one asset of the first party on a time axis into at least two non-overlapping timed assets of the first party, the partition being based on a period of time that has elapsed since a time associated with the partitioning with a value of a first timed asset expiring when the period of time elapses and a value of a second timed asset becoming effective when the period of time elapses and the cryptographically signed data on the first party digital wallet representing a transfer of ownership of the second timed asset of the at least two non-overlapping timed assets of the first party to said second party, wherein the first timed asset is used as currency by the first party after the partitioning but before the period of time elapses and the second timed asset is used as currency by the second party after the period of time elapses; and
replicating, by the one or more processors of the first party client device, the cryptographically signed data representing the partitioning and the transfer of ownership of one of the second timed asset of the first party to said second party to the plurality of other party digital wallets on the other party client devices, including the at least one second party digital wallet on the second party client device, associated with the plurality of other party network nodes, the cryptographically signed data replication causing the partition and transfer to be irreversible.

2. The method of claim 1, wherein replicating the cryptographically signed data representing ownership of the at least one asset of the first party having the predefined value further comprises replicating the cryptographically signed data representing ownership of at least one asset of a first party having a predefined monetary value stored on the first party digital wallet associated with the first party network node to the plurality of other party digital wallets on other party client devices, including the at least one second party digital wallet on the second party client device, associated with the plurality of other party network nodes.

3. The method of claim 1, wherein receiving entry of the cryptographically signed data representing the partition of the at least one asset of the first party on the non-value axis into at least two non-overlapping timed assets and the transfer of ownership of one of the at least two non-overlapping assets of the first party to the second party further comprises receiving entry of the cryptographically signed data on the first party digital wallet representing the partition by the first party of the at least one asset into at least two non-overlapping complementary assets of the first party and the transfer of ownership of one of the at least two non-overlapping complementary assets to the second party.

4. The method of claim 1, wherein receiving entry of the cryptographically signed data on the first party digital wallet representing the partition by the first party of the at least one asset of the first party into the first complementary timed asset of the first party valid for the first predetermined period of time and the second complementary timed asset of the first party valid for the second non-overlapping predetermined period of time and the transfer of ownership of one of the at least two non-overlapping complementary timed assets of the first party to the second party further comprises receiving entry of the cryptographically signed data on the first party digital wallet representing the partition by the first party of the at least one asset of the first party into the first complementary timed asset of the first party valid for a first predetermined period of time and the second complementary timed asset of the first party valid for the second non-overlapping predetermined period of time commencing at an expiration of the first predetermined period of time and the transfer of ownership of one of the at least two non-overlapping complementary timed assets of the first party to the second party.

5. The method of claim 1, further comprising receiving entry of cryptographically signed data on one of the first party digital wallet and the at least one second party digital wallet representing a merging of a first one of said at least two non-overlapping assets with a second one of said at least two non-overlapping assets into an equivalent of said at least one asset.

6. The method of claim 1, wherein receiving entry of the cryptographically signed data representing the partition of the at least one asset of the first party into at least two non-overlapping assets of the first party and the transfer of ownership of one of the at least two non-overlapping assets of the first party to the second party further comprises receiving entry of the cryptographically signed data on the first party digital wallet representing the partition by the first party of the at least one asset of the first party into at least two non-overlapping conditional assets of the first party and the transfer of ownership of one of the at least two non-overlapping conditional assets of the first party to the second party.

7. The method of claim 6, wherein receiving entry of the cryptographically signed data representing the partition by the first party of the at least one asset of the first party into at least two non-overlapping conditional assets of the first party and the transfer of ownership of one of the at least two non-overlapping conditional assets of the first party to the second party further comprises receiving entry of the cryptographically signed data on the first party digital wallet representing the partition by the first party of the at least one asset of the first party on the non-value conditional axis into the first non-overlapping conditional asset valid only for a first entity-owner of the first non-overlapping conditional asset, a second non-overlapping conditional asset valid only for a second entity-owner of the second non-overlapping conditional asset, and a switch or fuse with predetermined parameters validating ownership of one of said first and second non-overlapping conditional assets and nullifying ownership of the other of said first and second conditional assets, and the transfer of ownership of one of the at least two non-overlapping conditional assets of the first party to the second party.

8. The method of claim 1, wherein receiving entry of cryptographically signed data on the first party digital wallet representing a partition of the at least one asset of the first party into at least two non-overlapping assets and the transfer of ownership of one of the at least two non-overlapping assets of the first party to the second party further comprises receiving entry of cryptographically signed data on the first party digital wallet representing a partition by the first party of the at least one asset on both a non-value temporal axis and a non-value conditional axis into at least two non-overlapping complementary conditional timed assets of the first party and a transfer of ownership of one of the at least two non-overlapping complementary conditional timed assets of the first party to the second party.

9. The method of claim 1, wherein replicating the cryptographically signed data representing said partition and transfer of one of the at least two non-overlapping assets of the first party to said second party to the plurality of other party digital wallets on the other party client devices associated with the plurality of other party network nodes further comprises replicating cryptographically signed data representing the partition and transfer of ownership of a first one of at least two non-overlapping complementary assets of the first party to the second party to the plurality of other party digital wallets on the other party client devices, including the at least one second party digital wallet on the second party client device, associated with the plurality of other party network nodes.

10. The method of claim 9, wherein replicating cryptographically signed data representing the partition and transfer of ownership of a first one of at least two non-overlapping complementary assets of the first party to the second party to the plurality of other party digital wallets on the other party client devices associated with the plurality of other party network nodes further comprises replicating cryptographically signed data representing the partition and transfer of ownership of a first one of at least two non-overlapping complementary timed assets of the first party to the second party to the plurality of other party digital wallets on the other party client devices, including the at least one second party digital wallet on the second party client device, associated with the plurality of other party network nodes.

11. The method of claim 10, wherein replicating cryptographically signed data representing the partition and transfer of ownership of the first one of the at least two non-overlapping complementary timed assets of the first party to the second party to the plurality of other party digital wallets on the other party client devices associated with the plurality of other party network nodes further comprises replicating cryptographically signed data representing the partition and transfer of ownership of the first one of the at least two non-overlapping complementary timed assets of the first party valid for a first predetermined period of time to the second party to the plurality of other party digital wallets on the other party client devices, including the at least one second party digital wallet on the second party client device, associated with the plurality of other party network nodes.

12. The method of claim 1, wherein replicating the cryptographically signed data representing said partition and transfer of ownership of one of the at least two non-overlapping assets of the first party to the second party to the plurality of other party digital wallets on the other party client devices associated with the plurality of other party network nodes further comprises replicating cryptographically signed data representing the partition and transfer of ownership of the first one of at least two non-overlapping conditional assets of the first party to the second party to the plurality of other party digital wallets on the other party client devices, including the at least one second party digital wallet on the second party client device, associated with the plurality of other party network nodes.

13. The method of claim 12, wherein replicating cryptographically signed data representing the partition and transfer of ownership of a first one of at least two non-overlapping conditional assets to the second party to the plurality of other party digital wallets on the other party client devices associated with the plurality of other party network nodes further comprises replicating cryptographically signed data representing the partition and transfer of ownership of a first one of the at least two non-overlapping conditional assets valid only for a first entity-owner of the first conditional asset to the second party to the plurality of other party digital wallets on the other party client devices, including the at least one second party digital wallet on the second party client device, associated with the plurality of other party network nodes.

14. The method of claim 13, further comprising replicating cryptographically signed data representing transfer of ownership of a switch or fuse of the first party to a third party digital wallet to the plurality of other party digital wallets on the other party client devices validating ownership of one of said first and second non-overlapping conditional assets and nullifying the other of said first and second non-overlapping conditional assets.

15. The method of claim 1, wherein where said cryptographically signed data is signed with a private key of a private-public key pair.

16. A system, comprising:
a first party client device having one or more processors programmed to:
replicate cryptographically signed data representing ownership of at least one asset of a first party having a predefined value stored on a first party digital wallet associated with a first party network node to a plurality of other party digital wallets on other party client devices, including at least one second party digital wallet on a second party client device, associated with a plurality of other party network nodes communicably coupled to the first party network node and to one another;
receive entry of cryptographically signed data on the first party digital wallet representing a partitioning by the first party of the at least one asset of the first party into at least two non-overlapping conditional assets of the first party, the partition being based on a period of time that has elapsed since a time associated with the partitioning with a value of a first timed asset expiring when the period of time elapses and a value of a second timed asset becoming effective when the period of time elapses and the cryptographically signed data on the first party digital wallet representing a transfer of ownership of the second timed asset of the at least two non-overlapping assets of the first party to said second party, wherein the first timed asset is used as currency by the first party after the partitioning but before the period of time elapses and the second timed asset is used as currency after the period of time elapses; and replicate the cryptographically signed data representing the partitioning and the transfer of ownership of the second conditional asset of the first party to said second party to the plurality of other party digital wallets on the other party client devices, including the at least one second party digital wallet on the second party client device, associated with the plurality of other party network nodes, the cryptographically signed data replication causing the partition and transfer to be irreversible.

\* \* \* \* \*